(12) United States Patent
Schubert

(10) Patent No.: US 12,534,257 B2
(45) Date of Patent: Jan. 27, 2026

(54) PROCESS FOR CHANGING A UNIT ON A PACKAGING LINE AND PACKAGING LINES DESIGNED FOR THIS PURPOSE PACKAGING LINE

(71) Applicant: Gerhard Schubert GmbH, Crailsheim (DE)

(72) Inventor: Gerhard Schubert, Crailsheim (DE)

(73) Assignee: Gerhard Schubert GmbH, Crailsheim (DE)

( * ) Notice: Subject to any disclaimer, the term of this patent is extended or adjusted under 35 U.S.C. 154(b) by 1073 days.

(21) Appl. No.: 17/620,555

(22) PCT Filed: Jun. 10, 2020

(86) PCT No.: PCT/EP2020/066082
§ 371 (c)(1),
(2) Date: Jul. 18, 2022

(87) PCT Pub. No.: WO2020/254166
PCT Pub. Date: Dec. 24, 2020

(65) Prior Publication Data
US 2022/0347839 A1    Nov. 3, 2022

(30) Foreign Application Priority Data
Jun. 18, 2019    (DE) .......................... 102019116523.7

(51) Int. Cl.
*B65B 59/04* (2006.01)
*B25J 9/00* (2006.01)
*B25J 9/08* (2006.01)
*G05B 19/418* (2006.01)

(52) U.S. Cl.
CPC ............. *B65B 59/04* (2013.01); *B25J 9/0009* (2013.01); *B25J 9/08* (2013.01); *G05B 19/41845* (2013.01)

(58) Field of Classification Search
CPC .......... B25J 9/0009; B25J 9/08; B25J 9/1679; G05B 19/41815; G05B 19/41845; G05B 2219/40059; G05B 2219/45048; Y02P 90/02; B65B 59/04
See application file for complete search history.

(56) References Cited

U.S. PATENT DOCUMENTS

| | | | |
|---|---|---|---|
| 2003/0014944 A1* | 1/2003 | Bennett | B65B 5/101 53/448 |
| 2010/0140969 A1* | 6/2010 | Lin | B25J 15/0052 294/86.4 |

(Continued)

*Primary Examiner* — Himchan Song
(74) *Attorney, Agent, or Firm* — Head, Johnson, Kachigian & Wilkinson, PC

(57) ABSTRACT

In a packaging line (1) comprising a plurality of robots (7), in order to be able to replace a faulty unit, in particular robot (7), quickly and with minimal, preferably no manpower, in particular during running operation of the packaging line (1), the unit to be changed is automatically decoupled from the power and data feeds and from the purely mechanical connections and is removed from the packaging line (1), preferably transversely to the throughput direction (10') of the packaging line (1), and the new unit is automatically introduced in the opposite direction, is positioned, and is mechanically fixed, and the energy and data supplies are automatically coupled.

12 Claims, 13 Drawing Sheets

(56) References Cited

U.S. PATENT DOCUMENTS

Figure 1A:
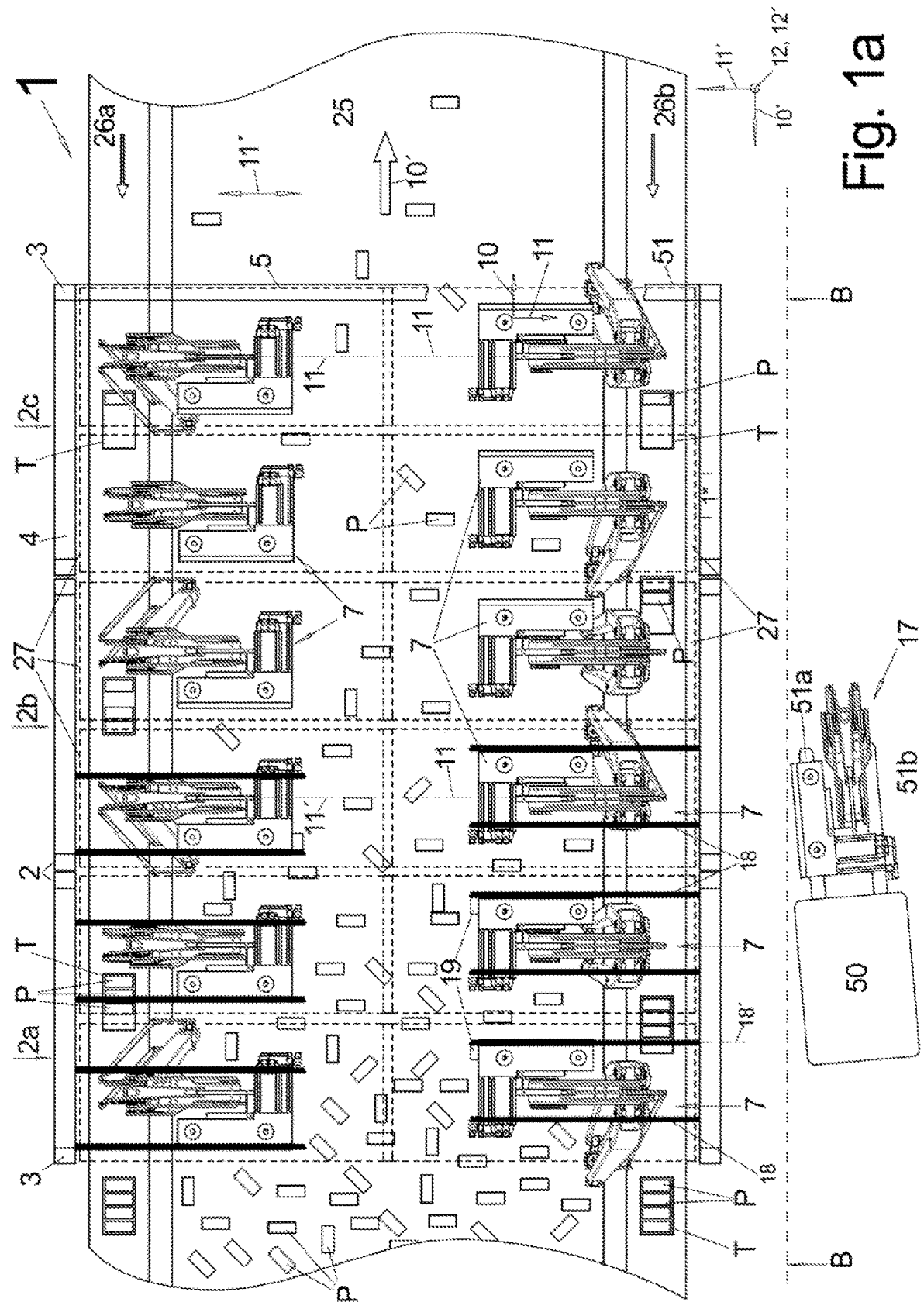

| | | | |
|---|---|---|---|
| 2014/0013707 A1* | 1/2014 | Murarotto | B65B 11/045 |
| | | | 53/203 |
| 2019/0061980 A1* | 2/2019 | Nysted | B65B 39/06 |
| 2020/0239172 A1* | 7/2020 | Brikmann | B25J 19/0025 |
| 2022/0204203 A1* | 6/2022 | Gabusi | B65B 35/16 |
| 2023/0192039 A1* | 6/2023 | Kim | B60S 5/00 |
| | | | 700/259 |
| 2023/0381907 A1* | 11/2023 | Nishimiya | B23Q 17/2428 |

* cited by examiner

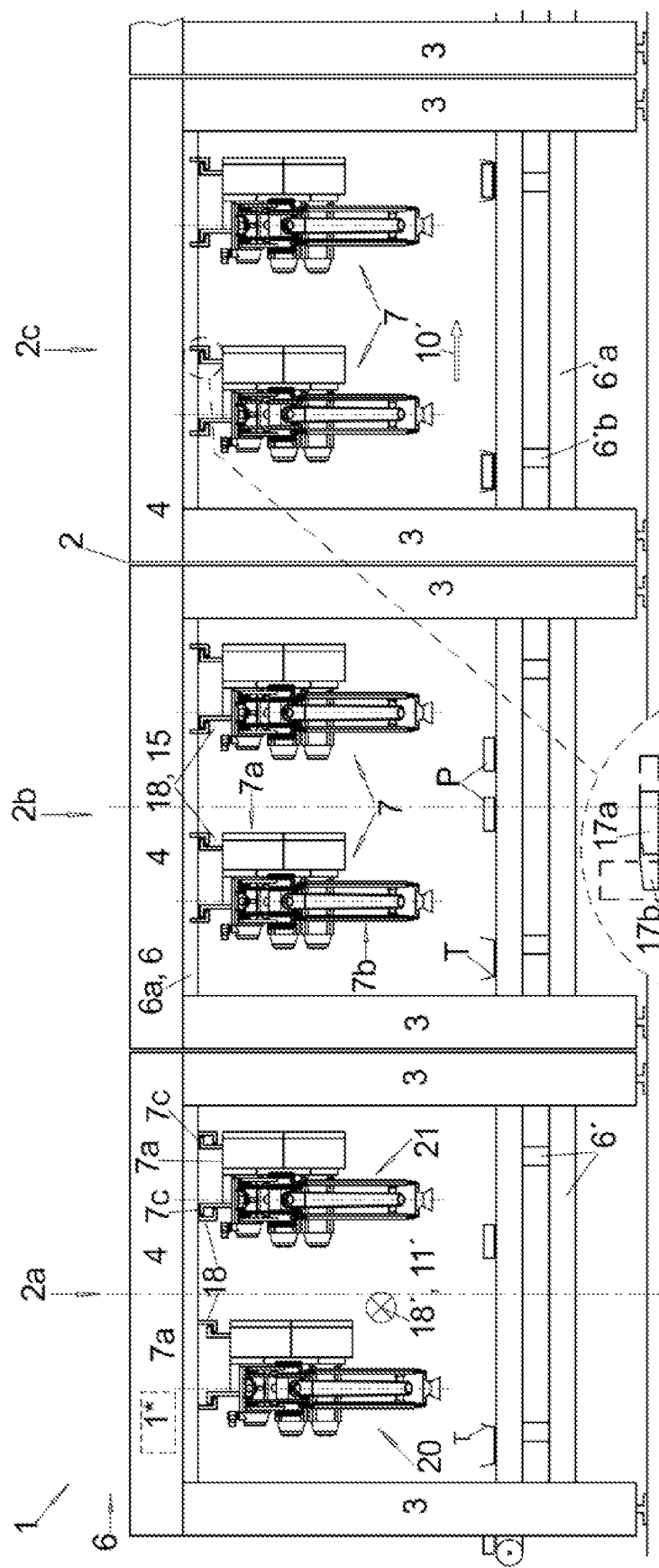
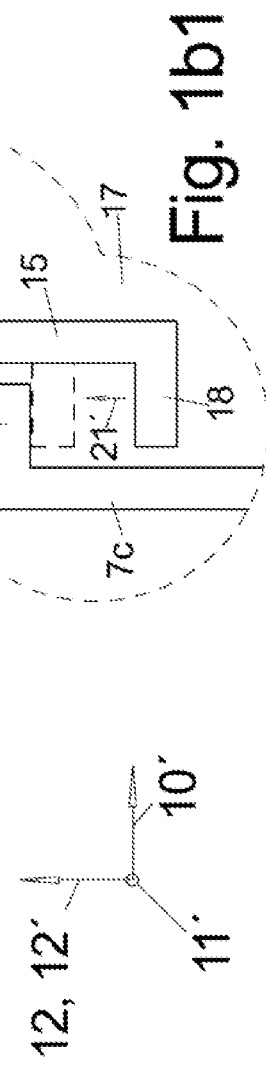

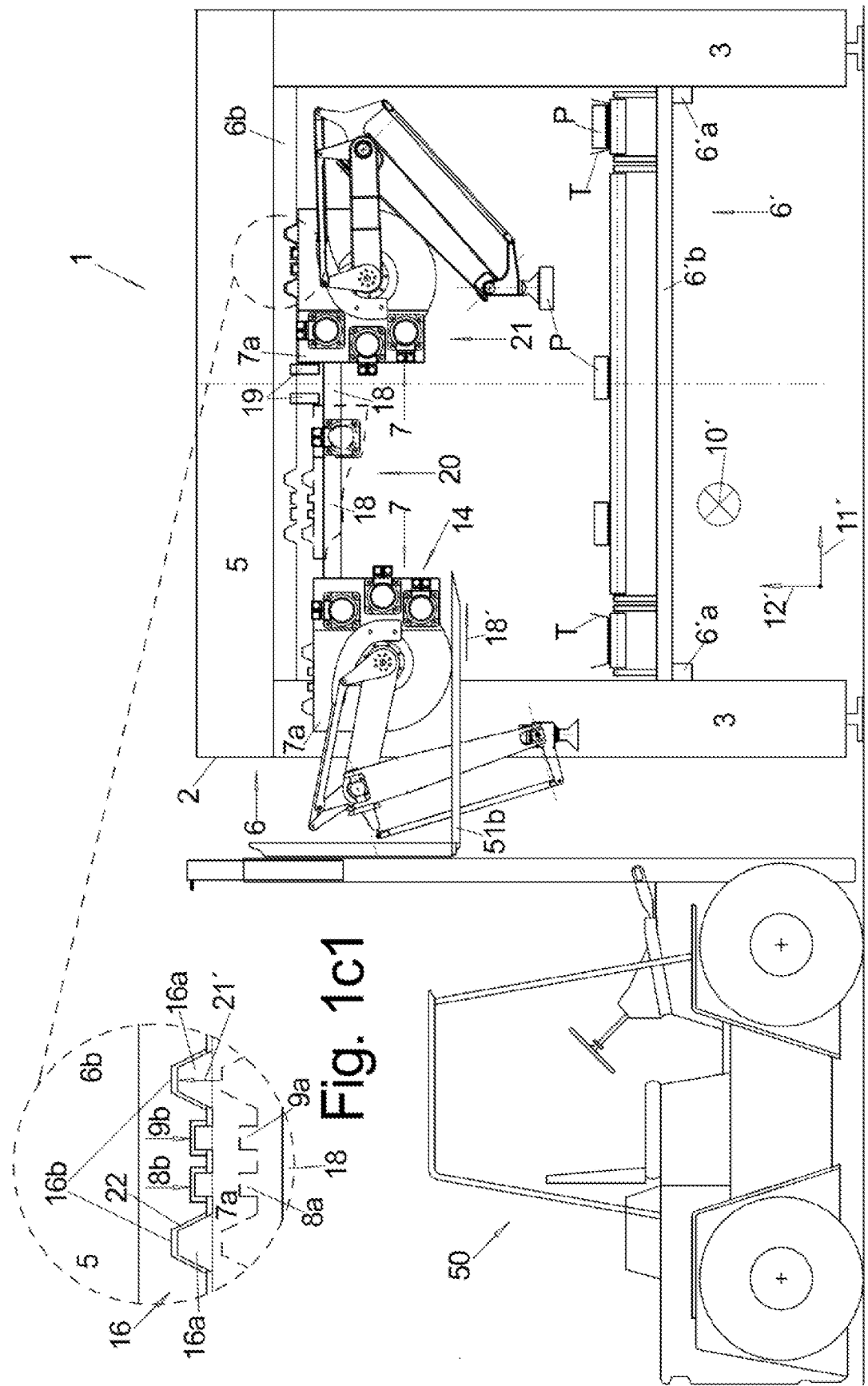

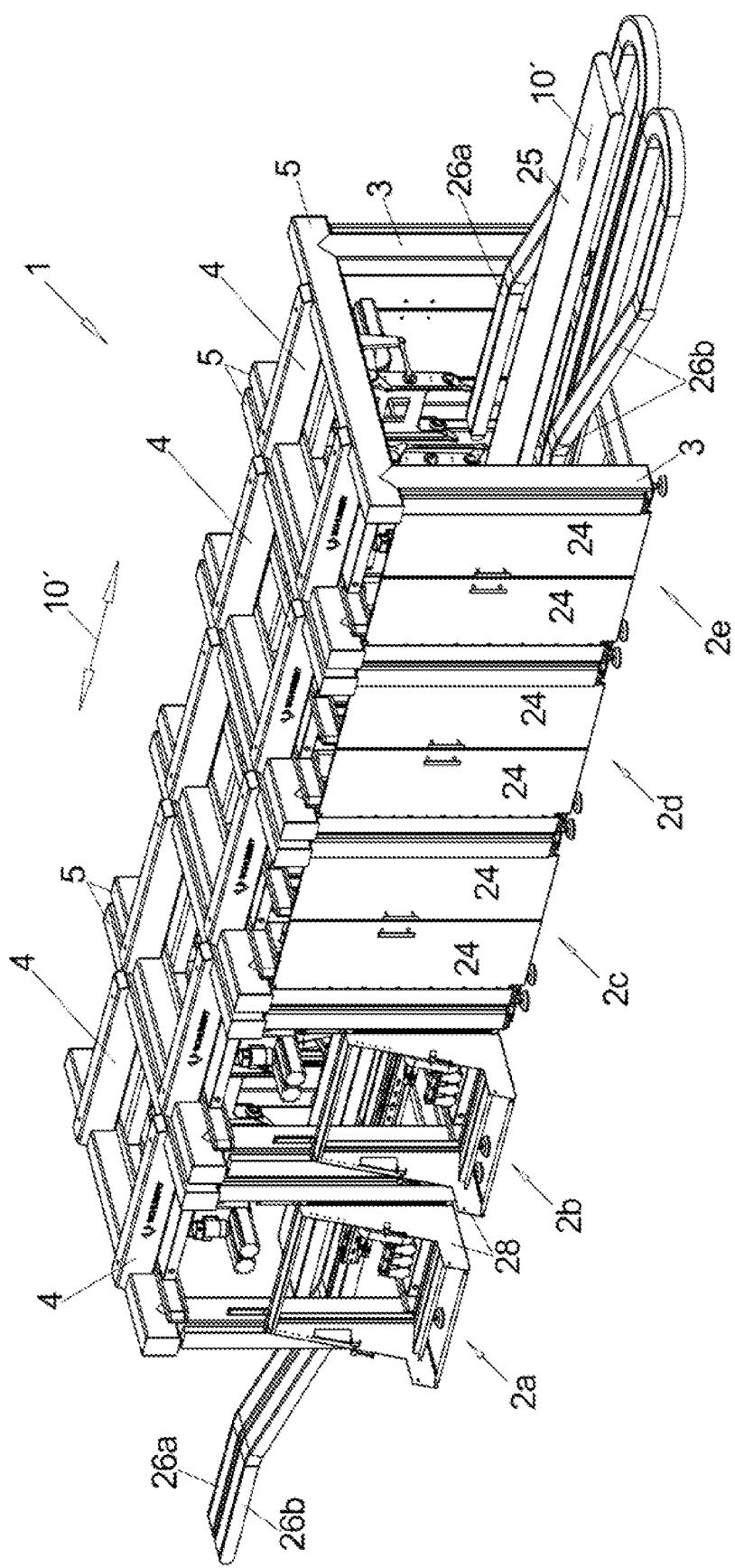

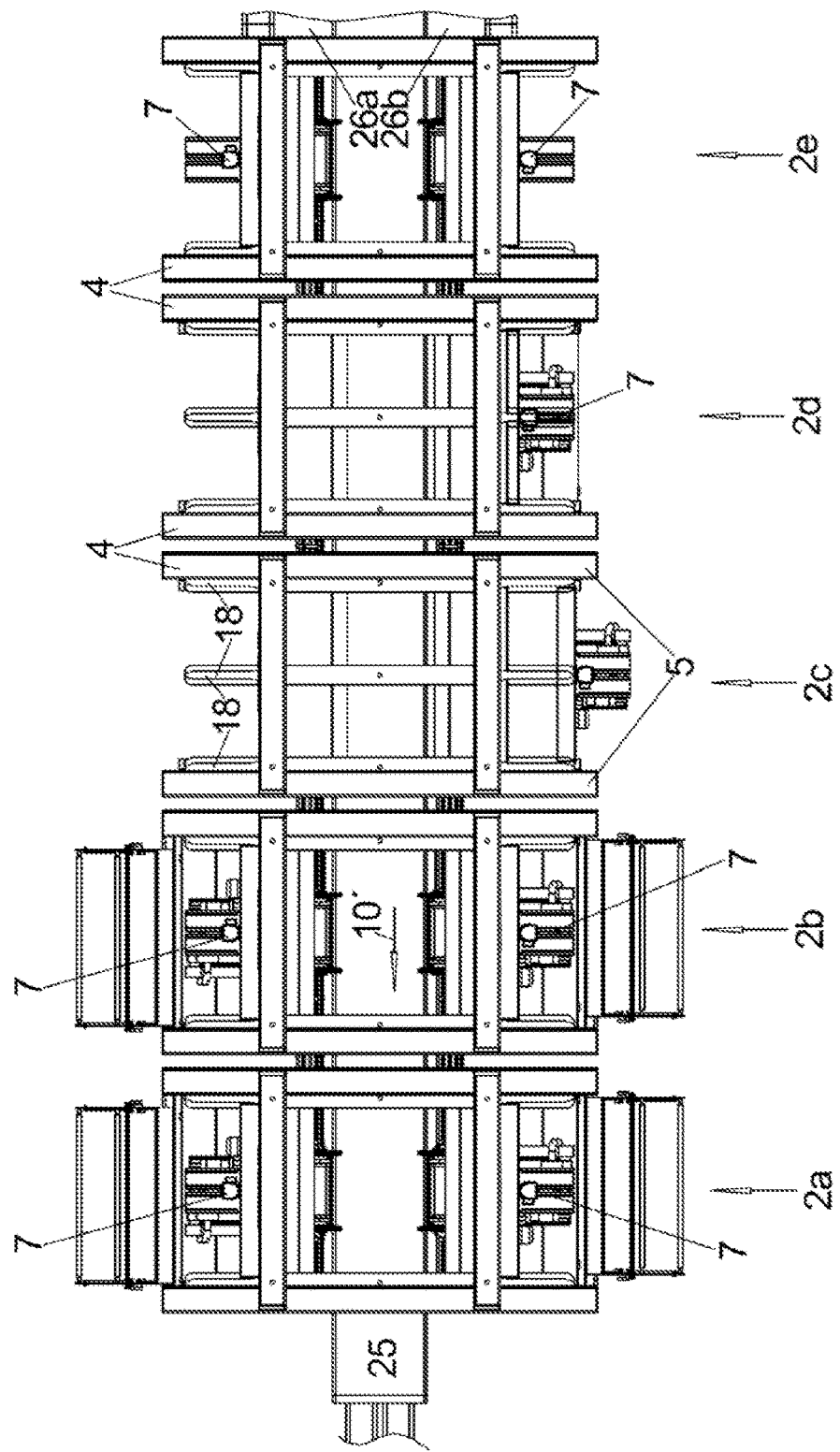

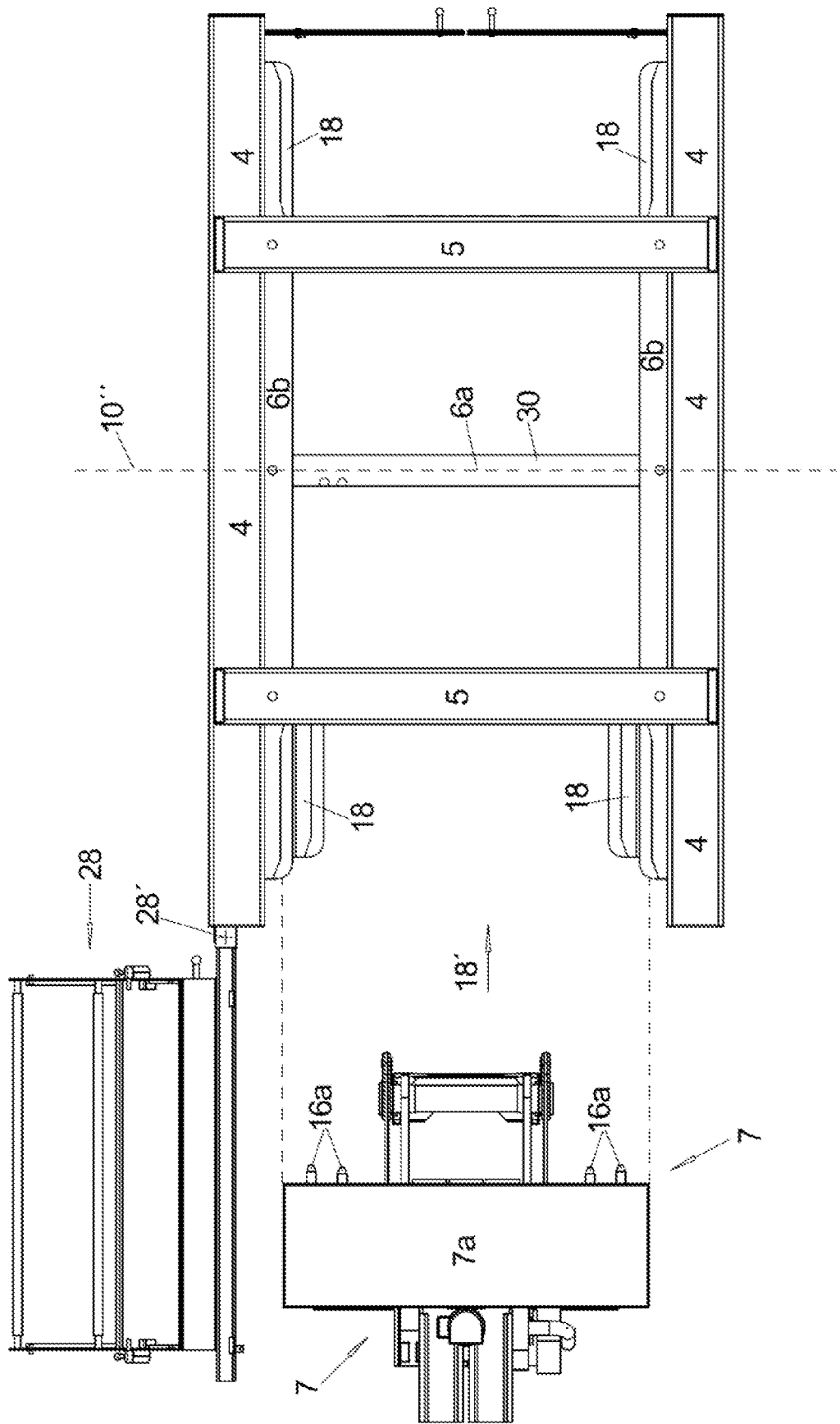

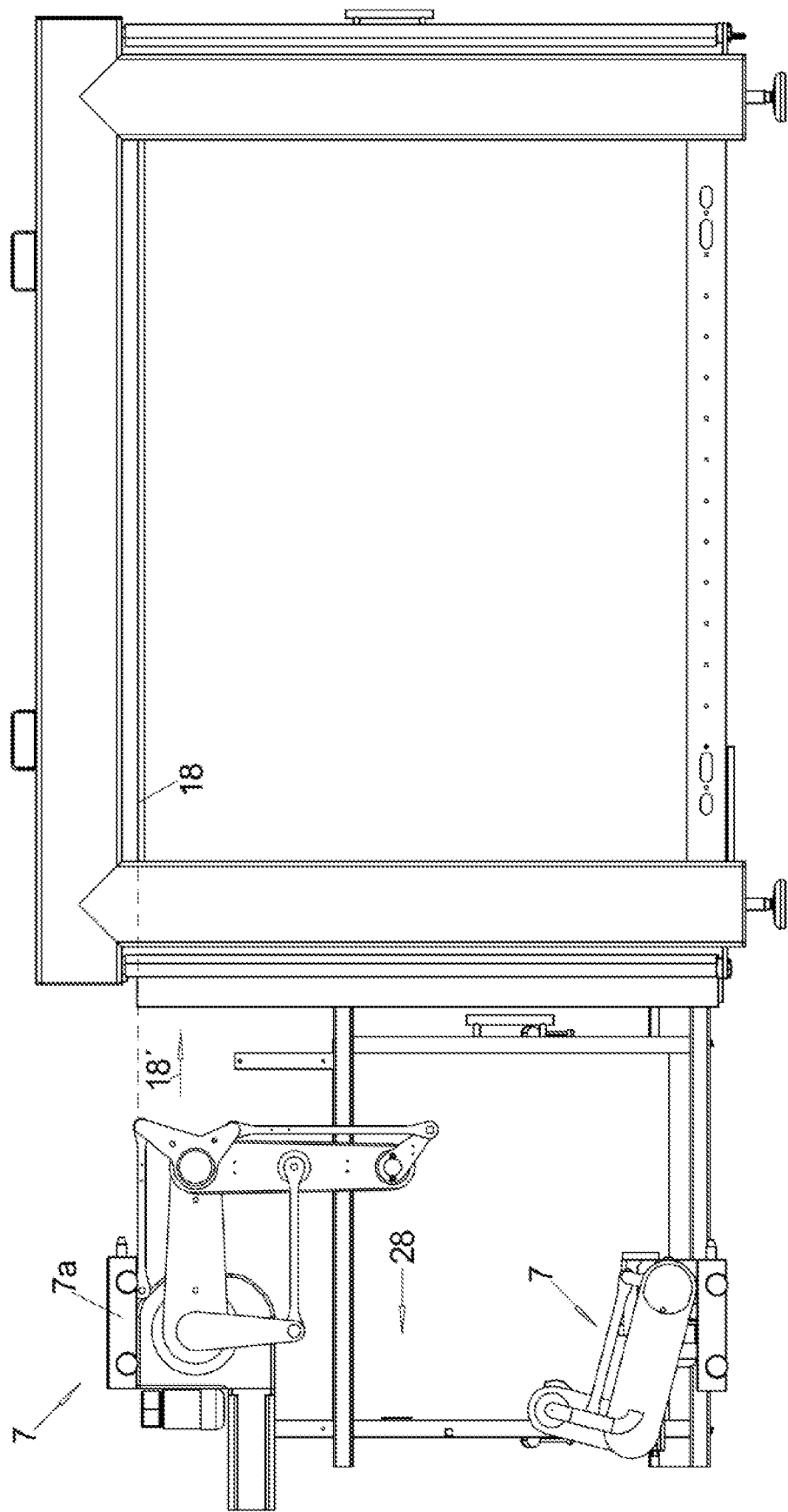

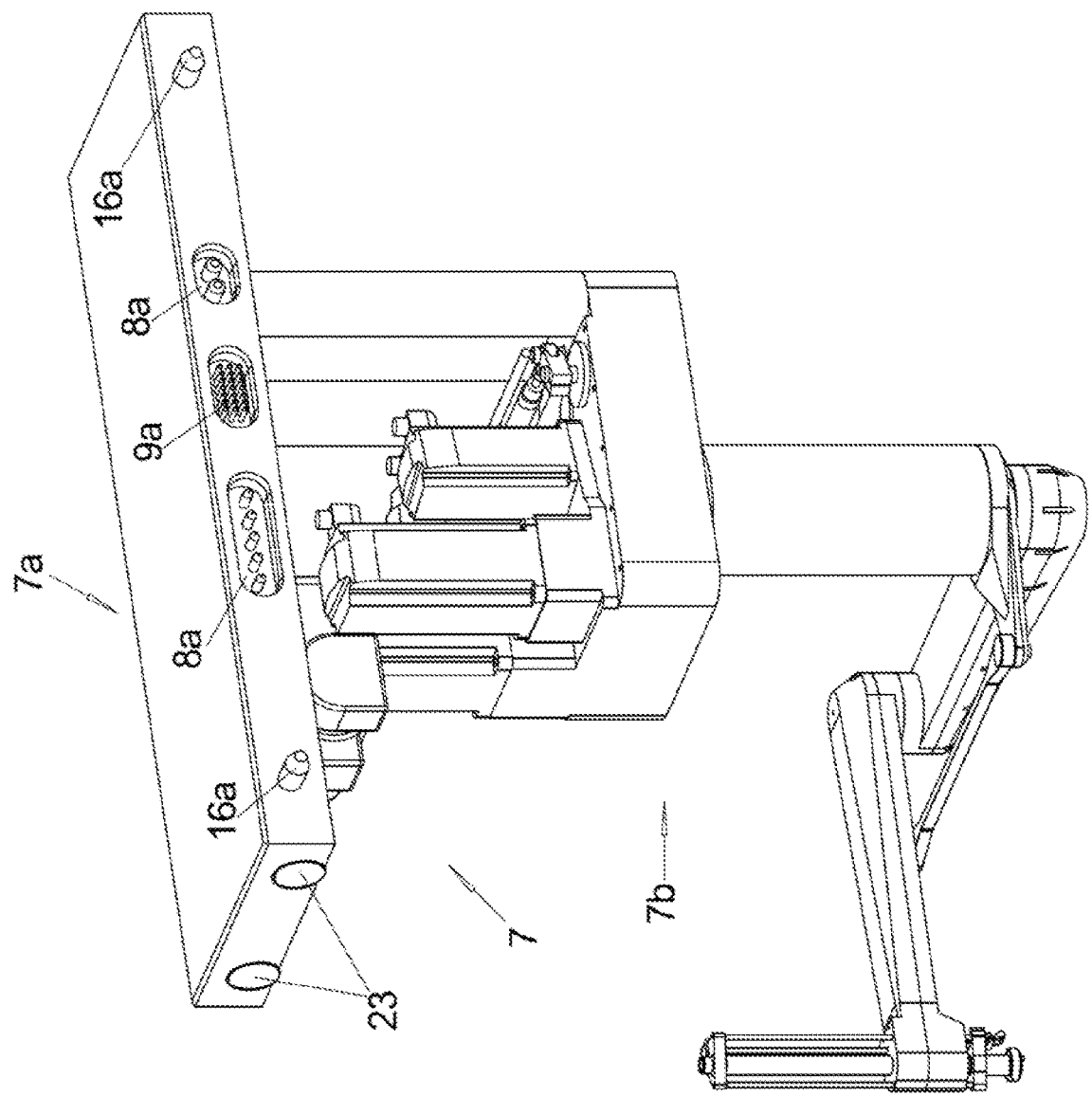

PROCESS FOR CHANGING A UNIT ON A PACKAGING LINE AND PACKAGING LINES DESIGNED FOR THIS PURPOSE PACKAGING LINE

FIELD OF APPLICATION

The invention relates to packaging lines in which several robots arranged in series transfer products into packaging, usually containers, e.g. so-called trays.

TECHNICAL BACKGROUND

A packaging line generally comprises a product conveyor, on which the products to be transferred are delivered, and usually also a container conveyor, on which the empty containers are delivered and transported away filled with products.

At least one of these, preferably both, run within the packaging line in a passage direction which runs in the longitudinal direction of the packaging line, i.e. in the direction of its greatest extension, so that the passage direction of the products on the one hand and/or of the containers on the other coincides with the longitudinal direction of the packaging line.

Only in this way is it possible to arrange several robots one behind the other in this longitudinal direction—and often also opposite each other in two rows with respect to the longitudinal center of the packaging line—which transfer the products into the containers.

A packaging line can also contain other units in addition to the robots, for example processing units such as welding, gluing or sealing units, or also non-movable units such as a control unit which contains parts or the entire electronic control of the robot line in the form of a rack insert.

In addition, such a packaging line contains aggregates in the form of drive units such as motor-gearbox units, hydraulic aggregates such as hydraulic pumps, or pneumatic aggregates such as overpressure or vacuum pumps.

In the course of operation of such a packaging line, it is always necessary to change some of these units, either because a unit, especially a robot, is defective and has to be changed, or because such a change makes sense due to a new packaging task.

Until now, robots in particular have been changed manually by manually disconnecting the data and power connections, which usually involved a screw connection, and also manually disconnecting the mechanical fastening of the robot to the base frame or a supporting structure carried by the base frame, and manually removing the robot and also manually replacing it by a new robot.

On the one hand, this requires trained personnel, on the other hand, this takes a lot of time and contains potential sources of error.

Above all, however, such work by one or more operators within the packaging line generally requires the line to be shut down altogether, which leads to high downtimes.

For cleaning reasons, packaging lines today usually have an elevated base frame in which upright support columns are connected at the upper end by longitudinal and transverse cross beams which together form the base frame.

All the units installed in the base frame are supported by this base frame, whereby the robots in particular are usually not attached directly to the base frame but to an upper supporting structure of longitudinal and/or transverse beams attached to it.

Since this upper support structure is located in the upper area of the base frame, the robots can be attached in a suspended position, i.e. with their base on the support structure and with their one or more robot arms suspended downward, in order to be able to grip the products running on the product belt in the lower area and insert them into the packaging or trays located next to them, also in the lower area, usually on a container belt.

The product belt and container belt are also fastened by means of a lower support structure, usually at a distance above the bottom, for example at table height, so that the space below remains free and can be easily cleaned.

DESCRIPTION OF THE INVENTION a) Technical Object

It is therefore the object of the invention to provide a method for the rapid and at least partially automatic changing of an unit like an aggregate or a robot of a packaging line, which preferably also requires no shutdown of the entire packaging line during the change, as well as a packaging line suitable therefor.

b) Achievement of the Object

This object is solved by the features of claims 1 and 10. Advantageous embodiments result from the subclaims.

With regard to the method, this object is solved in that both when the old unit or aggregate is removed, its mechanical fixation as well as its energy connection and data connection to the rest of the packaging line is automatically released or, in the case of an inserted new unit or aggregate, it is automatically connected to the packaging line.

The insertion of the new unit or aggregate into the packaging line is preferably carried out up to a transfer position and—depending on the weight of the unit or aggregate—manually or with the aid of a delivery device which carries the unit or aggregate and inserts it into the packaging line, in particular pushes it in.

One of the main advantages of the robot exchange described below is that, after the connections have been automatically released, the robot can be automatically and unmanned removed from the base frame and lowered to working height, so that no technician has to climb around on the top of the base frame to release connections there and/or carry out repairs on the assembled robot.

Repairs to the robot are either carried out off-site in a separate workshop, or at least next to the packaging line on the robot that has been lowered to working height, or the faulty robot is returned to the manufacturer in a defective condition.

Such a delivery device can be operated manually or also perform the delivery process automatically. Preferably, the delivery device is a self-propelled vehicle that can be moved, for example, on the ground or on a support frame under the hall ceiling where the packaging line is located.

Theoretically, the delivery device could also be mounted to move along the base frame of the packaging line, but this should not lead to an increase in the overall height of the packaging line.

It goes without saying that already during the loosening of the mechanical fixation between the unit or aggregate and the rest of the packaging line and during the entire period in which this mechanical fixation is loosened, the unit or aggregate must be supported, for example by a delivery device or must rest on the delivery guides of the packaging line.

The transfer position at which the new unit is set down on or in the packaging line, in particular when it is set down from the delivery device, can also be the final assembly position, but these two positions are generally different.

Thus, the new unit must first be moved from the transfer position to the assembly position by a transfer device attached to the packaging line, since only there the coupling of data connection and energy connection between the new unit and the packaging line is carried out and also the mechanical fixing, preferably after previous exact positioning.

This is because the exact positioning of the new aggregate, e.g. robot, in the packaging line is essential for the control, since all movements of the robot are calculated and determined on the basis of this.

In this context, it should be mentioned that, as a rule, the central control of the packaging line only distributes the program for the respective packaging job to the respective sub-controllers (VMS), each of which controls one group of robots, while all other control tasks are left to the sub-controllers, each of which controls one group of robots.

In order to bring the intended robot to the intended assembly position, each assembly position for robots preferably has its own identification, in particular identification number, and/or likewise each robot, so that the central control or sub-control can carry out an unambiguous change order on the basis of input of the corresponding identification numbers by the operator and/or error messages from the corresponding identification numbers.

The removal of the old unit and/or the insertion of the new unit is preferably carried out transversely to the longitudinal direction of the packaging line, these two operations being carried out in opposite transverse directions.

Preferably, these operations, in particular the insertion operation, are carried out by moving the aggregate along delivery guides which run in this delivery direction, i.e. preferably transversely to the longitudinal direction, the passage direction of the packaging line.

The transfer position is then preferably specified by a delivery stop acting in the delivery direction, so that when this stop is contacted the new unit is automatically deposited, for example by the delivery device, at the transfer position thus reached.

The displacement between the transfer position and the assembly position—if these are not identical—preferably takes place in a direction which runs transversely to the delivery direction and can, for example, be directed in the longitudinal direction or can preferably also run transversely to this.

In a preferred form, the assemblies are moved in the horizontal transverse direction to a transfer position on or in the packaging line during delivery and removal, but are moved vertically between the transfer position and the assembly position. Preferably, the assembly position is vertically above the transfer position.

At the assembly position, the new unit is first positioned exactly, preferably by means of mechanical positioning elements, and only then fixed mechanically.

If the unit to be changed, be it the new or the old unit, can assume different spatial, physical states, for example can be unfolded or folded together, it is first brought into a compact state, in particular its most compact state, for the removal process and/or the insertion process, in which this unit has its smallest possible dimensions in at least one spatial direction, preferably in all spatial directions. This minimizes the risk of collisions with other components of the packaging line during the changeover process.

When a robot is changed, its robot arm is folded up as compactly as possible.

However, the unit to be changed can also be a processing unit present in the packaging line, such as a gluing unit, a laser unit, a sealing unit or similar.

The unit to be changed can also be another electrical, pneumatic or hydraulic unit, for example a drive unit or even just a pump, or it can be the control unit in which all or part of the control of the packaging line is physically housed.

The entire changeover process is preferably carried out in such a way that the packaging line can remain in operation during the changeover process and only the unit to be changed is deactivated. In particular, the unit to be changed is no longer supplied with power or data from the start of the change process.

Preferably, after the new unit has been installed, the readiness for use of the new unit is checked by means of a test program.

A check of the actual assembly position of the newly assembled unit can also be carried out.

A packaging line suitable for implementation comprises first of all the usual components such as a base frame, a plurality of robots mounted directly or indirectly on the base frame one behind the other in the passage direction, and a control system which controls at least all the robots and, in addition, all the other moving elements of the packaging line.

According to the invention, such a packaging line also has an assembly device for at least partially automatic assembly and disassembly of the unit at a defined assembly position and also a coupling device for automatic coupling and uncoupling of the data connection and/or the power connection of the unit to be changed, e.g. robot, with the corresponding mating connections of the packaging line.

In addition, the control must be able to control the operations necessary for the changeover of an aggregate, which must be carried out from the side of the packaging line.

For this purpose, the control preferably also includes a test program with which the automatically inserted and assembled aggregate can be tested for its complete operability before it enters regular operation and/or its correct assembly position can also be checked.

Then it is at least possible that—as soon as the new aggregate has reached the mounting position—to fix it automatically to the packaging line and to connect said connections to each other.

For this purpose, the assembly device preferably comprises, on the one hand, a positioning device for exact automatic positioning at the assembly position, for example with the aid of mechanical positioning elements such as centering pins, which are inserted into corresponding centering recesses of the respective other component. The components to be positioned in relation to each other are therefore the base frame or another supporting part of the packaging line on the one hand and the assembly unit, in particular the robot, on the other.

Preferably, the assembly device also comprises a fixing device for automatic mechanical fixing of the aggregate, in particular after it has been automatically positioned exactly at the assembly position.

If the assembly position and the transfer position are not identical, the assembly device preferably also comprises a displacement device, in particular a lifting device, with which the unit can be automatically displaced between a transfer position and the assembly position.

Preferably, the base frame comprises delivery guides which run in the delivery direction, along which the unit to be changed can be displaced, for example when it is inserted from the outside and pushed into a transfer position which is preferably located within the packaging line.

Preferably, there is a transfer stop against which the unit to be inserted abuts when it is inserted along the delivery guides and which defines the transfer position.

The base frame is preferably elevated.

Preferably, therefore, the base frame consists of upright supporting columns which are connected to one another in their upper region, preferably at their upper end, by longitudinal cross beams and transverse cross beams and which together form the base frame.

The robots are then attached either directly to the longitudinal beams and/or cross beams, but preferably indirectly by means of a supporting structure which is attached to the longitudinal cross beams and transverse cross beams, whereby the robots are attached in a suspended manner, i.e. the robot base is attached to the cross beams or the supporting structure and the at least one robot arm points downwards from the robot base.

Preferably, the base frame, in particular the embodiment of the base frame described above, has a modular structure, so that in particular a frame module, viewed from above, consists of four upright support columns arranged in a rectangle and two longitudinal cross-members and two transverse cross-members connecting these in the upper region, in particular at the upper end.

The product conveyor and/or container conveyor usually present in the packaging line, on the other hand, are mounted below and at a lower level at working height, usually on a lower supporting structure consisting of longitudinal struts and cross struts, which is connected to the upright supporting columns.

EXEMPLARY EMBODIMENTS

Figure 2C:
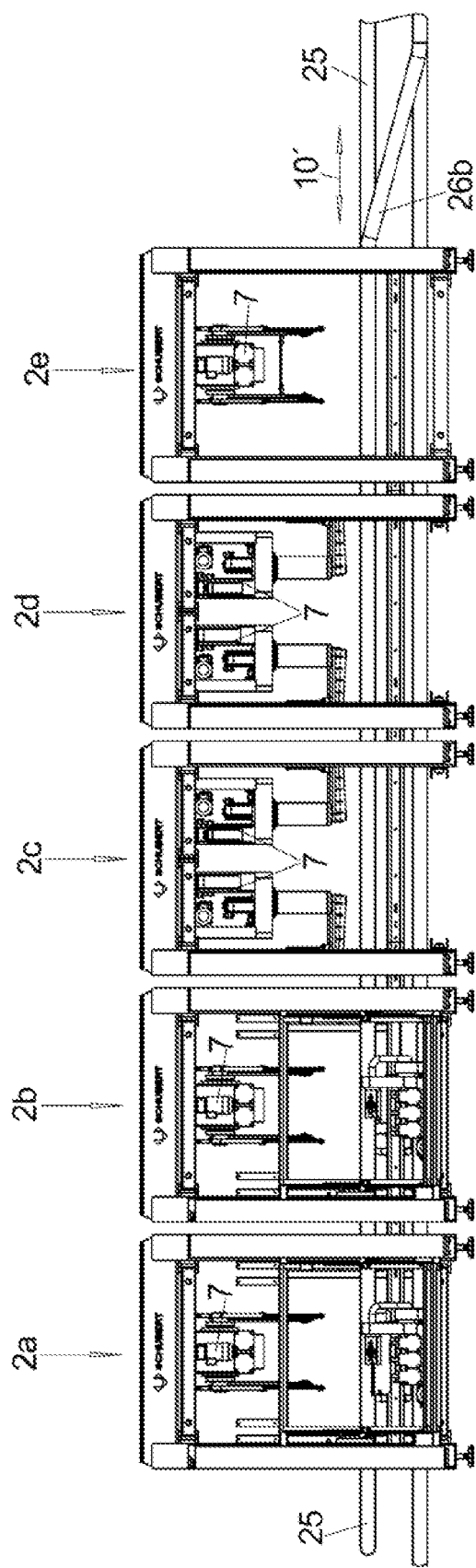
Figure 2D:
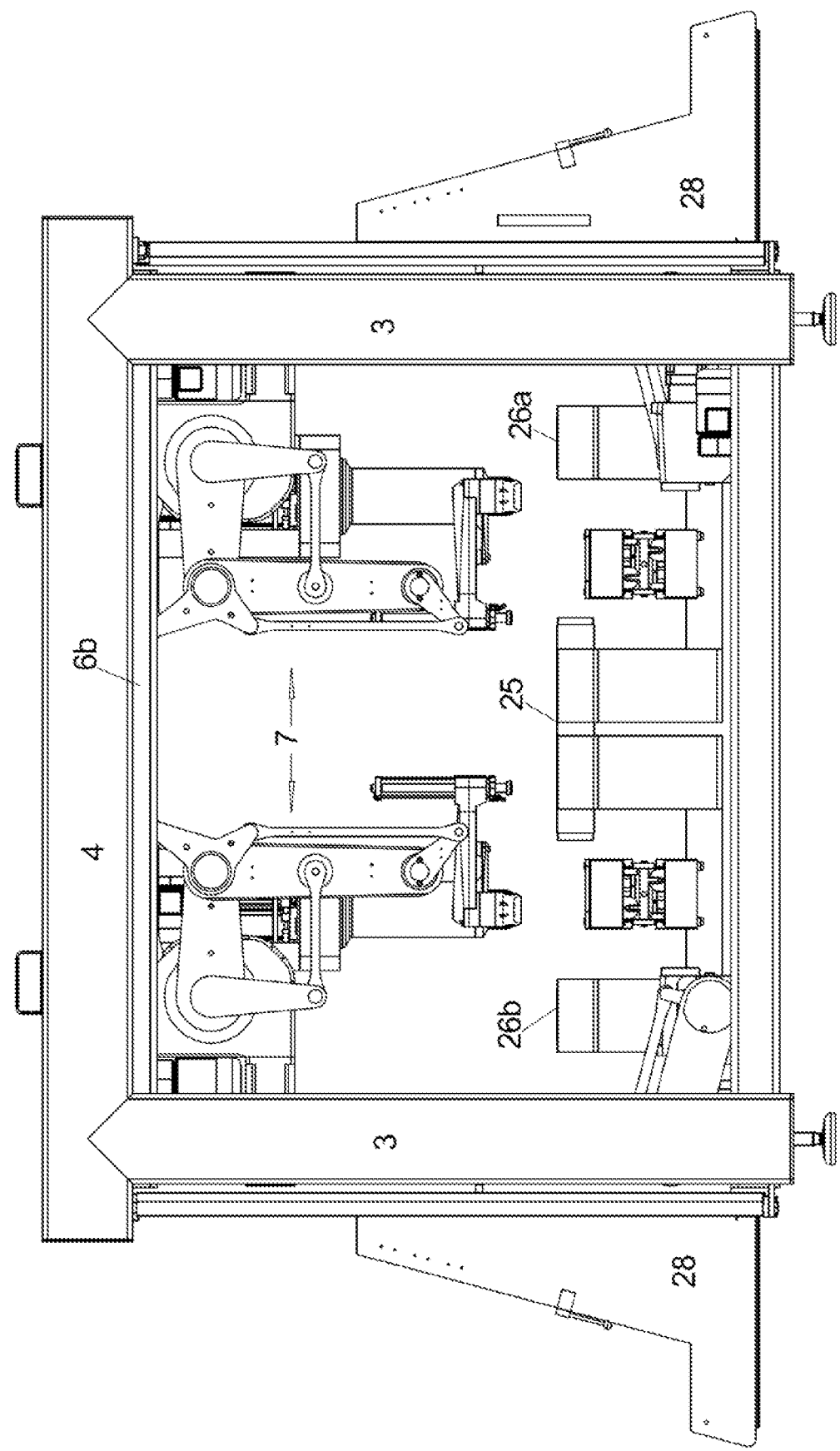
Figure 3A:
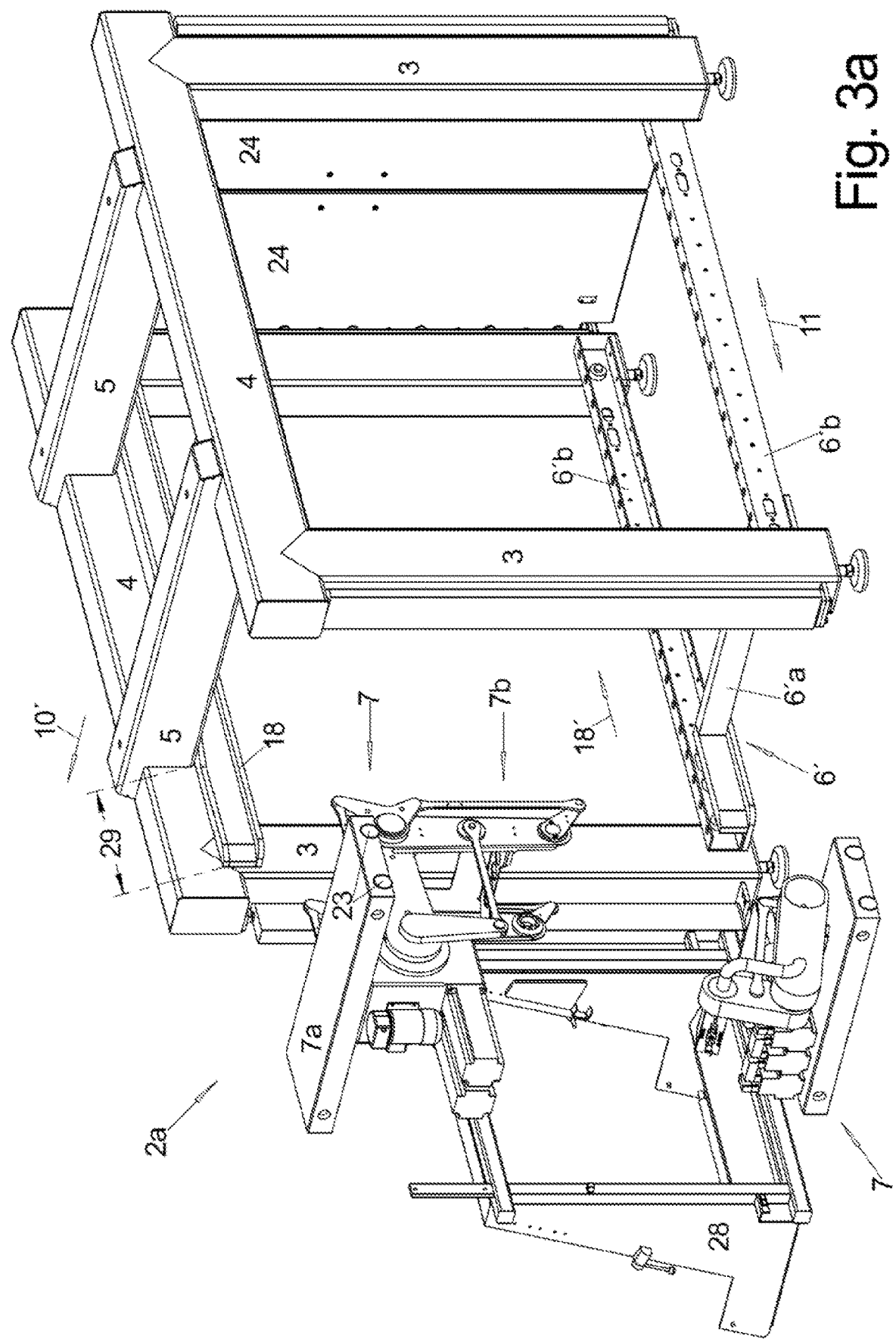
Figure 3D:
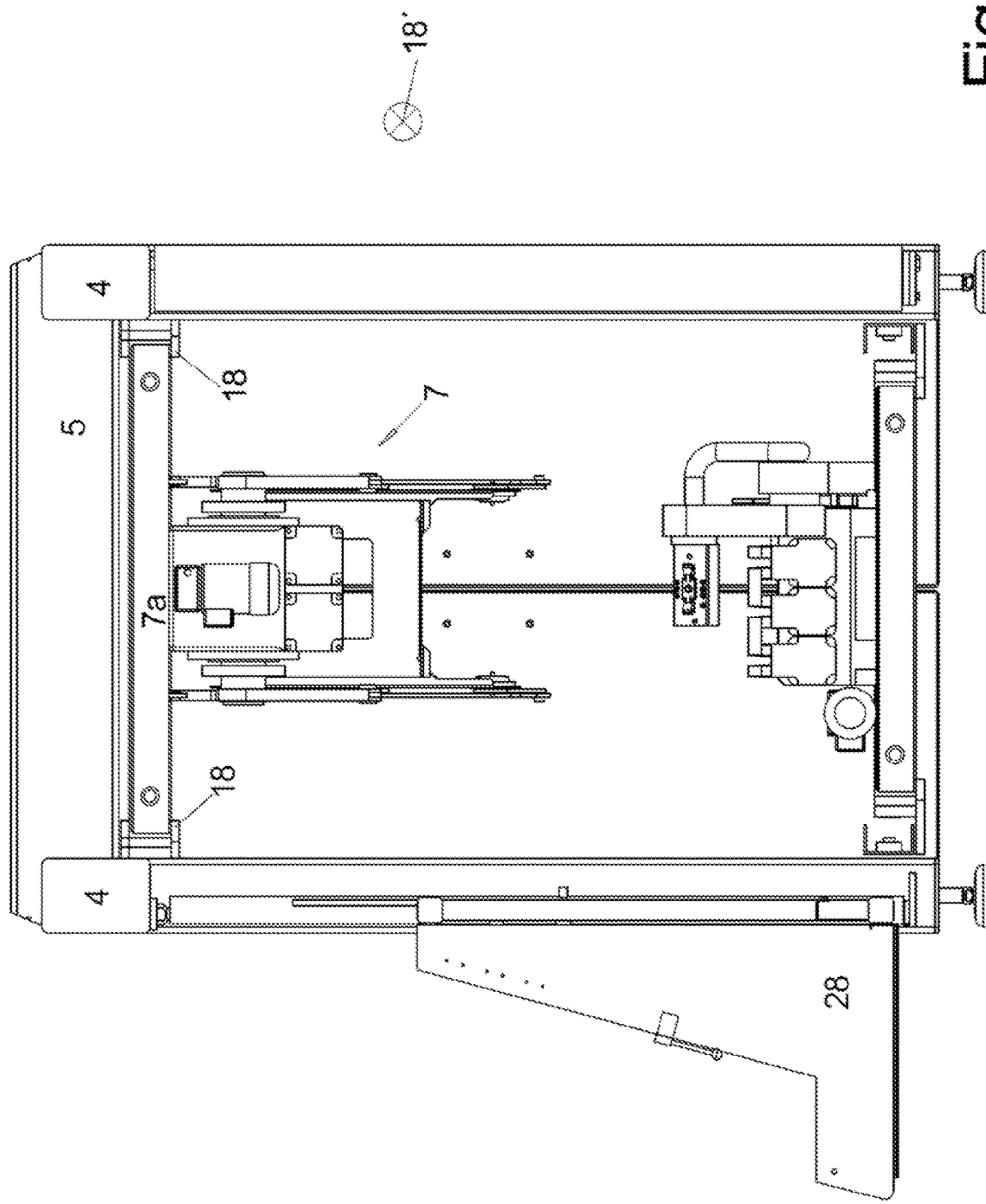
Figure 4:
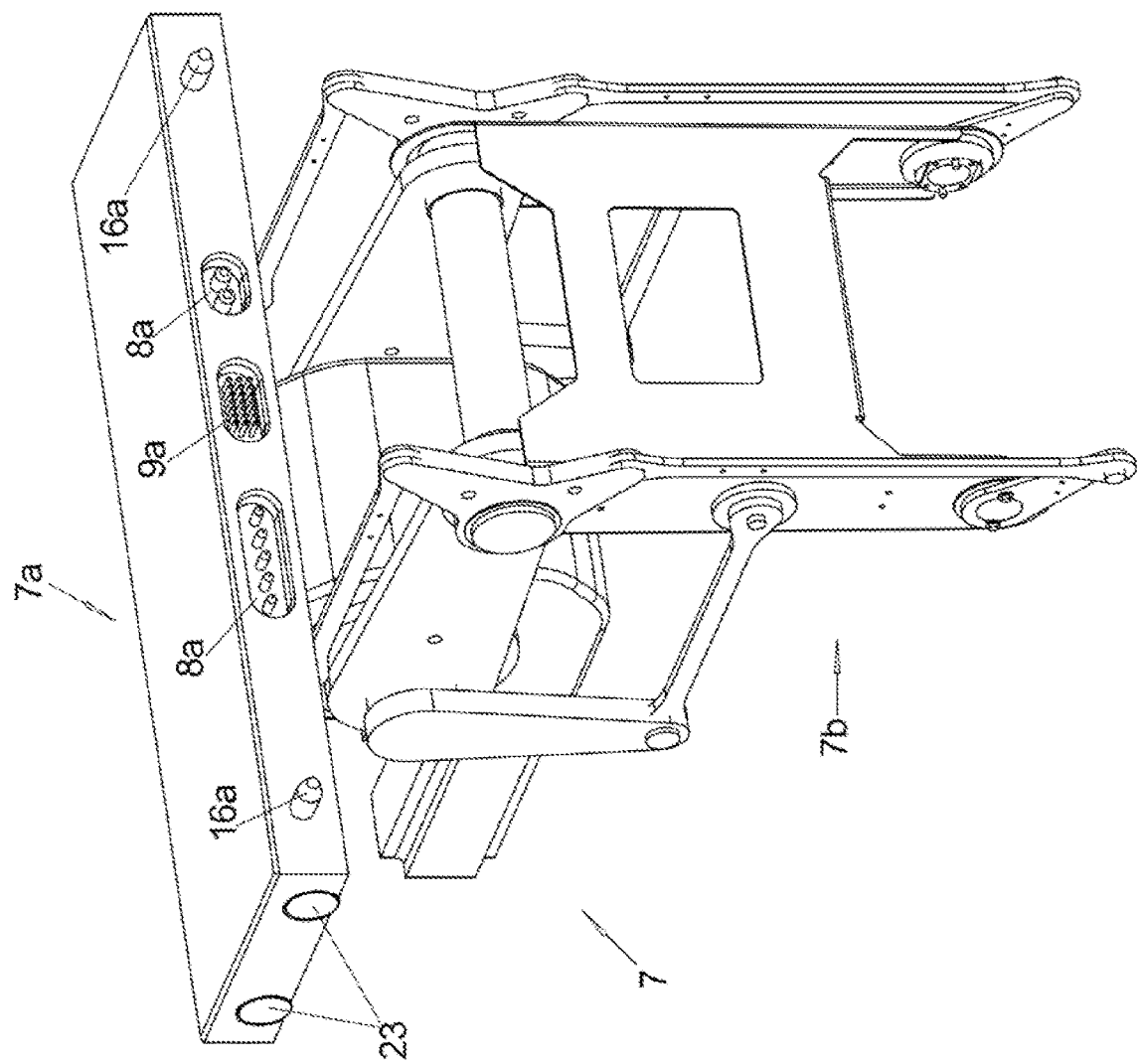

Embodiments according to the invention are described in more detail below by way of example. They show:

FIG. 1a: a packaging line in plan view,

FIG. 1b: the packaging line of FIG. 1a in side view, i.e. transverse to its passage direction, FIG. 1b1: an enlargement of FIG. 1b, FIG. 1c: the packaging line viewed in the passage direction, FIG. 1c1: an enlargement from FIG. 1c, FIG. 2a: another packaging line in perspective view, FIG. 2b: the packaging line according to FIG. 2a in top view, FIG. 2c: the packaging line according to FIG. 2a without safety doors in side view, FIG. 2d: the packaging line according to FIG. 2a viewed in the passage direction FIG. 3a-d: the changing of a robot shown on a single frame module of the packaging line according to FIG. 2a in perspective view, top view, viewed in through-feed direction, as well as in side view, FIG. 4: an individual representation of the robot shown in FIGS. 2 and 3 in perspective view, FIG. 5: a single representation of another robot in perspective view FIGS. 1a, b, c first show a known packaging line, which transfers products P into ready containers, so-called trays T, with the aid of robots 7.

For this purpose, the products P are distributed in an unordered manner on a conveyor belt, the so-called product belt 25, in the passage direction 10', while the empty trays T are transported on, in this case, two conveyor belts, each running parallel to, but in the opposite direction to, one of the longitudinal sides of the product belt 25. In this case, the empty trays T are transported on two conveyor belts 26a, b, each running parallel to one of the longitudinal sides of the product belt 25 but in the opposite direction to the latter.

A number of robots 7 are arranged one behind the other in the passage direction 10' and in two rows next to one another in the transverse direction 11' of the packaging line 1 above the product belt 25 and the container belts 26a, b, their respective working area 27, viewed from above, covering in each case a longitudinal region of one of the container belts 26a, b defined in the passage direction 10' and a region of the product belt 25 adjoining it in the transverse direction and extending at least as far as the longitudinal center of the product belt 25.

Each robot can thus pick up a product P lying on the container belt 25 in its working area 27, either individually or in groups, and deposit them in the tray T moving on the corresponding container belt 26a, b, the belts 25, 26a, b generally moving continuously, preferably constantly.

Accordingly—as can be seen in FIG. 1a—at the end on the infeed side in the passage direction 10', the product belt 25 is occupied by many products P and ideally there are no more products on the product belt at the end of the transfer area in which the robots 7 are located. Conversely, the trays T are empty when they enter the transfer area and preferably leave this transfer area only in a state completely filled with products P.

As is also known, the robots 7 are attached to the base frame 2 of the packaging line 1 in a suspended manner from above, i.e. attached to the base frame 2 by their robot base 7a to which the robot arm 7b is attached, as can be seen in FIGS. 1b, 1c.

In this case, the base frame 2 consists of a plurality of frame modules 2a, b, c, which are in contact with each other in the direction of travel 10', or are connected to each other at a short distance, each of which, when viewed from above—as can best be seen in FIG. 1a—consists of four vertical support columns 3 arranged in a rectangle, which are connected in pairs in the longitudinal direction 10', i.e. the direction of travel 10', by means of a longitudinal cross-member 4 in each case, and the pairs of support columns 3 in the same longitudinal position are connected to one another by means of one of two cross-beams 5 in each case.

The robots 7—of which two are arranged one behind the other in the longitudinal direction and two are arranged opposite each other in the transverse direction 11', i.e. a total of four robots 7 per rack module, e.g. 2b—are preferably not suspended directly from the base frame, but from an upper supporting structure 6, which in turn is attached to the base frame 2, in particular its cross-beams 5 and/or longitudinal cross-beams 6a, usually just below them, and comprises longitudinal cross-beams 6a running in the longitudinal direction 10', for example, and possibly also cross-beams 6b, as shown in FIG. 1c.

Likewise, the product belt 25 running below the robots and the container belts 26a, b running parallel thereto inside the base frame 2 are also preferably not fastened directly to the base frame 2 but to a lower supporting structure 6', which is spaced from the base but fastened to the base frame 2 at a height below the robots 7, usually approximately at knee height to hip height of an operator standing next to them.

In this case, the lower supporting structure 6' comprises longitudinal cross members 6'a extending in the longitudinal direction 10', which preferably extend over the entire length of product belt 25 and/or container belts 26a, b, and transverse cross-beams 6'b extending in the transverse direction 11' over the entire width of the base frame 2, at least over the width of both rows of robots 7 attached thereto, and also over the total width of the belts 25, 26a, b arranged next to one another.

The control 1* controlling the entire packaging line 1 is usually arranged in one of the hollow longitudinal beams 4, as are further electrical, hydraulic or pneumatic units.

To explain how the intended, at least partially automatic replacement of an aggregate according to the invention can proceed, this is illustrated by means of a robot 7 as an aggregate, whereby aggregates such as the hydraulic, pneumatic or electric aggregates mentioned can also be replaced at least partially automatically, analogous to robots 7.

To change a robot 7, the robot 7 to be removed—as shown in FIG. 1c—is to be removed from the packaging line 1 in the transverse direction 11' after it has been detached from the packaging line 1 and the new robot 7 to be inserted is to be delivered in the opposite transverse direction in the delivery direction 18', inserted into the base frame 2 and there fixed and coupled to the base frame 2 at the correct mounting position.

The robot 7 to be changed is picked up and transported away and the new robot 7 is delivered by a delivery device 50, here in the form of a delivery device to be driven manually by an operator, for example a forklift truck 50, which is equipped here with conventional lifting tines 51a, b, but which—not shown—can be specially equipped with holding elements adapted to pick up a robot 7 to be transported.

FIG. 1c shows, for example, the delivery of the new robot 7, which rests with its robot base 7a on the lifting tines 51a, b, which can be moved in height relative to the forklift 50, whereby the robot 7 rests with its transverse direction 11—which in the position mounted in the packaging line 1 corresponds to the transverse direction 11' of the robot line 1—approximately in the direction of travel of the lifting tines 51a, b, i.e. with the longitudinal direction 10 of the robot 7 transverse to the direction of travel of the lifting tines 51a, b. The direction of travel of the lifting tines 51a, b is also the direction of movement of the forklift 50 during straight-ahead travel.

The forklift 50 or, in general, a delivery vehicle transporting the robots 7 to be changed can also travel autonomously and is then preferably guided by means of appropriate sensors, in particular when introducing the new robot 7 into the packaging line 1.

For at least partially automatic changing and also automatic insertion of an aggregate such as a robot 7, an assembly device 14 is provided, which consists of several parts.

In the present exemplary embodiment, the robot 7 to be inserted is brought with the aid of the delivery vehicle, i.e. the forklift 50, to a transfer position 20 and deposited there, and—in particular after removal of the delivery vehicle 50—is brought from there to an assembly position 21, the final position of the robot 7 in the base frame 2, in which it is functional after appropriate connection to power and data supply.

In the exemplary embodiment of FIG. 1, the assembly device 14 is—except for the used delivery vehicle 50—completely part of the packaging line 1, i.e. essentially present at every potential robot position in the packaging line 1.

For transfer to the transfer position 20, a pair of delivery guides 18 are provided in the upper region of the base frame 2 extending in the transverse direction 11' at each potential robot position on the base frame, each of which has at least one upwardly facing support surface and a lateral boundary surface, as can be seen in FIG. 1b and in particular in the detail enlargements of FIG. 1b1.

Each robot 7 has in its upper region at least one robot guide part 7c, which has on both sides in each case a downwardly directed support surface, so that the robot 7 with its at least one robot guide part 7c—in the present case two separate robot guide parts 7c are shown—can be moved in between the two delivery guides 18 with the aid of the delivery vehicle 50 and after lowering by means of the lifting tines 51a, b the support surfaces of the robot guide parts 7c rest on the support surfaces of the delivery rails 18 and at the same time are also guided laterally in the transverse direction to the delivery direction 18', namely in the longitudinal direction 10' of the packaging line 1.

However, this depositing at the transfer position 20 (FIG. 1b, far left) only takes place when, during insertion by means of the delivery vehicle 50, the robot 7, in particular its robot guide part 7c, rests in the transverse direction 11' against a delivery stop 19 which also defines the transfer position 20.

Then the robot 7 is already in the correct transverse position in the transverse direction 11' of the packaging line 1, but not yet in the correct height position.

To achieve this, the assembly device 14 further comprises a displacement device 15, here in the form of a lifting device 15, which lifts the robot 7 in an assembly direction 21', which in this case is the vertical 12', to the assembly position 21 according to FIG. 1c1.

The displacement device 15 comprises in this case a part of the length of the delivery guides 18 or the entire delivery guides 18 on which the robot 7 rests, which by means of a lifting device 15 as displacement device raises the robot 7 so far as shown in FIG. 1b1—that as positioning device 16 the positioning elements 16a, b, namely centering pins 16a and centering recess 16b, of which preferably not only one but two each are located on the one hand on the robot base 7a in its upper region, in particular the robot guide part 7c, and on the other hand on the parts of the base frame supporting the robots 7, in particular the upper supporting structure 6.

The lifted state of the robot 7 after the transfer position 20 in the assembly position 21 with the aid of the delivery rails 18 is shown in FIG. 1b in the third and the further positions starting from the left as well as the lifting process in the enlargement of FIG. 1b1.

The second robot position from the left in FIG. 1b shows a robot 7 which has already been raised to the assembly position 21, but in which the delivery rails 18 remain at an unchanged height, i.e. the displacement device 15 required for this in the form of a lifting device 15 is effected by other parts.

For example, the lifting device 15 could not be a component of the base frame 1, but the lifting could also be effected by the external delivery vehicle 50, in that after insertion of the robot 7 between at least lateral guides 18 and attachment to the delivery stop 19, it lifts the robot 7 into the assembly position 21 by means of lifting the lifting tines 51a, b. The robot 7 is then lifted into the assembly position 21.

Preferably, by reaching and preferably fixing, in particular latching, by means of a coupling device in the assembly position 21, not only is the exact mechanical assembly position 21 reached by means of the centering elements as positioning elements 16a, b. The exact mechanical assembly position 21 is reached by means of the centering elements as positioning elements 16a, b. The exact mechanical assembly position 21 is reached by means of the centering elements as positioning elements 16a, b, but at the same time, as shown in FIG. 1c1, the energy connection 8a and data connection 9a on the robot 7 are automatically brought into operative connection with the corresponding mating elements 8b, 9b in the base frame 2 or the supporting structure 6, so that after reaching the assembly position 21 the robot is already ready for operation.

In order to permanently relieve the displacement device 15, in this case the lifting device 15, of the weight of the robot and to keep the centering elements and centering recesses permanently at the stop and thus to keep the robot 7 always exactly in the assembly position 21, there is also a fixing device 17 which preferably secures the height position of the robot 7 in this embodiment, as shown in FIG. 1b1:

Preferably, a fixing pin 17a is moved—preferably transversely to the assembly direction 21', in particular in or against the passage direction 10' of the packaging line 1—into a corresponding fixing recess 17b, which is located either in the corresponding part of the lifting device 15, here in a section of the delivery rail 18, or directly in the robot 7, in particular the robot guide part 7c.

Preferably, the fixing pin 17a is provided at the front end with a wedge-shaped inclined surface pointing upwards at an angle to its direction of movement, so that in the advanced position it holds the mating element, here the underside of the recess into which the fixing pin 17a enters, at the maximum attainable height position. Preferably, the fixing peg 17a is force-controlled for this purpose.

FIG. 2 show a packaging line 1 of a different design of the base frame 2, and FIG. 3 show the changing of a robot on one of the frame modules.

The main difference between the base frame 2 in FIGS. 2a to 2d and also the individual module shown in FIG. 3 is that the upper longitudinal cross members 4 running in the passage direction of the packaging line 1 are offset inwards in the transverse direction of the packaging line 1 and thus of each individual module from the outer ends of the cross members 5. The support columns 3, on the other hand, also support the cross-members 5 here near their outer ends.

In addition, in the case of the packaging line 1 in FIG. 2a, the frame modules 2c to 2e also show the safety doors 24 in the closed state, which close the free space between the support columns 3 of each module and thus prevent unauthorized persons from accessing the internal space of the packaging line 1 during operation.

Furthermore, the two container belts 26a, b running on both sides of the product belt 25 are embodied here in such a way that their return run runs below the container belt 25.

In the packaging line 1, the first two frame modules 2a, b are each used by the robots to erect carton blanks from the flat state to form a carton.

Therefore, on the longitudinal outer sides of the two frame modules 2a, b there is in each case a part of a blank magazine 28, which in operation contains a stack of blanks lying on top of each other, which are gripped individually one after the other by the robot 7 there and are erected and glued to a carton open at the top by being pressed through an erecting die not shown.

The erected cartons are placed on one of the tote belts 26a, b and transported by the latter from left to right in FIGS. 2a, b, c, while products are delivered on the product belt 25 in the opposite direction, i.e. in the direction of travel 10' from right to left, and are transferred to the erected cartons by robots not shown in FIGS. 2a, b. The product belt 25 is used to transport the cartons from left to right.

In the frame module 2e, the filled carton is closed and, if necessary, transferred to another means of transport.

As in FIG. 1, there are also—as best shown in FIG. 2b—two robots 7 on each side of the longitudinal center opposite each other at the same longitudinal position, as can also be seen in FIG. 2d.

FIGS. 3a to 3d show the change of one of the robots 7 on the first frame module 2a:

In order for the robot 7 to be removed in the transverse direction to the passage direction 10' of the packaging line, the blank magazine 28 present on the longitudinal side surface of this module 2a may first have to be removed from there in order to allow access on this side for a delivery device 50—not shown here for reasons of clarity—which delivers the new robot 7.

In this case, the blank magazine 28 can be swiveled outward by 90° about an upright axis between the upper and lower crossbars 4 projecting laterally outward, as best seen in FIGS. 3d and 3b—freeing the side surface. The safety doors 24 on this side, which are no longer shown here and are usually located in the height area above the blank magazine 28, must also be swung open in the same way.

In this design, too, two delivery guides 18 run under the longitudinal cross-members 5 of the frame module 2a in the transverse direction 11' of the packaging line 1, each of which is located close to one of the two cross-members 4, each of which, viewed in the transverse direction 11', has a lower leg pointing inwards as the delivery guide, and are mounted at such a distance from one another that the robot base 7a, from which the rest of the robot 7 hangs downwards, including the robot arm 7b, can be placed thereon with its ends pointing in and against the passage direction 10'.

For this purpose, the robot base 7a, which in this case is approximately plate-shaped and lies horizontally, has two downwardly projecting rollers 23 at each of its lateral ends pointing in and against the direction of travel 10', with which the robot base 7a can be rolled further in the direction of the longitudinal center plane 10" after being placed on the support surface of the delivery guides 18.

As can best be seen in FIG. 3a, the back offset 29 by which the longitudinal cross members 5 of the base frame 2, i.e. of each frame module such as 2a, are offset relative to the free ends of the delivery guides 18 is at least as great as the extent of the robot base 7a in the transverse direction 11' of the packaging line 1 in the assembled state or in the delivery state.

In FIG. 3a, the previously removed defective robot 7 is still shown lying on the bottom.

Since there is no obstacle in the area of this back offset 29 above the downward projecting leg of the delivery guide 18, the new robot 7 can be transported at a height with the robot base 7a and thus the rollers 23 there above this lower leg of the support surface 18 up to close to the longitudinal beam 5—for example with a delivery vehicle 50 as shown in FIG. 1—and then placed on the support surface of the two delivery guides 18 on both sides, as can best be seen in FIG. 3b.

The delivery guides 18, which run in the transverse direction 11' as a U-profile with the open side facing each other in each module, e.g. 2a, and in fact essentially over the entire width of the robot line 1, therefore have no or a shortened free-end leg of the U-profile in the region of the rear offset 29 in the cross-sectional direction of the profile, in order not to obstruct the lowering onto the lower free-end leg of the robot base 7.

The remaining parts of the robot 7 hanging from the robot base 7a are narrower in the passage direction 10' and do not project beyond the end faces of the robot base 7a in this direction.

FIG. 4 shows the robot 7 to be changed individually, in perspective view, looking at the front side of the robot base 7a facing the longitudinal center plane 10" and extending in that direction.

It can be seen that the latter has two projecting positioning pins 16a, spaced apart from each other, which, when the robot 7 is pushed forward along the supply rails 18, enter and, because of their conical shape, center in corresponding snap-in recesses 16b formed in the central crosspiece 30, best seen in FIG. 3b, which also extends in the passage direction 10' of the packaging line 1.

Between the positioning pins 16a, two energy ports 8a, b, for example for electric current on the one hand and compressed air on the other, as well as a data port 9a can be seen in the front surface of the robot base 7a.

These automatically engage with corresponding mating elements in the center crosshead 30 as soon as the positioning pins 16a engage there.

In this engaged position, which is coupled in terms of data and energy, the robot base 7a and thus the entire robot 7 can also be fixed automatically by a fixing device not shown, in particular automatically.

The robots of FIGS. 1 to 4 have only two degrees of freedom, in that the upper and lower arms can be pivoted only in a vertical plane perpendicular to the passage direction 10' of the packaging line 1, and two robot arms are coupled to each robot, each with a lower arm and an upper arm.

FIG. 5 shows a different design of the robot which, however, has the same plate-shaped robot base 7a with all the features described thereon, such as rollers 23, power and data connections and positioning pins, but the robot suspended from this robot base 7a has four degrees of freedom, in that the robot arm, which is the only one present there, can be pivoted with its upper and lower arms in a horizontal plane and carries a lifting unit at the free end of the lower arm, which lifting unit can be adjusted vertically as well as rotated about the vertical and carries a tool such as a suction cup at the lower end.

It is thus clear that any type of robot 7 hanging thereon can be attached to such a robot base 7a, and if the robots 7 are not arranged hanging in the base frame but standing thereon, these can also sit on the robot base 7a.

Instead of a robot, any other processing unit can also be present on such a robot base 7a.

REFERENCE LIST

1 packaging line
1\* control, control unit
2 base frame
2a, b, c frame module
3 support column
4 longitudinal beams
5 cross beams
6 supporting structure
7 robot
7a robot base
7b robot arm
7c robot guide part
8 energy connection
9 data connection
10' longitudinal direction, passage direction of packaging line
10 transverse direction robot
11' horizontal transverse direction of packaging line
11 longitudinal direction robot
12 vertical direction, vertical
13 coupling device
14 assembly device
15 displacement device
16 positioning device
16a, b positioning element
17 fixing device
17a fixing pin
17b fixing recess
18 delivery guide
18' delivery direction
19 delivery stop
20 transfer position
21 mounting position
21' mounting direction
22 mounting stop
23 roller
24 safety door
25 product belt
26a, b container belt
27 work area
28 blank magazine
29 back offset
30 center traverse
50 delivery device, delivery vehicle
51a, b lifting tines
P product
T tray

The invention claimed is:

1. A method for at least partially automatically changing a robot (7) on a packaging line (1) having several robots (7), comprising:
  a) automatically disconnecting a data connection (9) as well as a power connection (8) between an old aggregate to be removed and the rest of the packaging line (1),
  b) mechanical connections between the old aggregate and the rest of the packaging line (1) are automatically released,
  c) an old robot is automatically removed from its assembly position (21) from the packaging line (1),
  d) a new robot is introduced into the packaging line (1) up to the assembly position (21),
  e) the new robot is mechanically coupled and fixed relative to the packaging line (1) automatically,
  f) the data connection (9a) and the power connection (8a) of the new robot are automatically coupled to the corresponding mating connections (8b, 9b) of the packaging line (1).

2. The method according to claim 1,
characterized in that
  in step c), the old robot is first removed to a transfer position (20) of the packaging line (1) and from there automatically out of the packaging line (1)
and/or
  in step d) the new robot is first moved to a transfer position (20) of the packaging line (1) and from there automatically to an assembly position (21).

3. The method according to claim 2,
characterized in that the transfer position (20) is the assembly position (21), and steps e) and f) are carried out at the transfer position (20).

4. The method according to claim 1, characterized in that in step c) the old robot is removed from the packaging line (1) in a removal direction (18'*b*) which runs transversely to the longitudinal direction (10) of the packaging line (1)

or in step d) the new robot is introduced into the packaging line (1) in a delivery direction (18'*a*) which runs transversely to the longitudinal direction (10') of the packaging line (1), the removal direction (18'*b*) and the delivery direction (18'*a*) run in the same delivery direction (18') but opposite directed.

5. The method according to claim 1, characterized in that the removal or insertion of the robot is effected by pushing it along delivery guides (18) which run in a delivery direction (18') and are present on the base frame (2) of the packaging line (1)

or the insertion is predetermined up to the transfer position (20) or assembly position (21) up to a delivery stop (19) effective in the delivery direction (18'*a*).

6. The method according to claim 1, characterized in that at the latest starting with step b) the old robot and during steps d) and e), the new robot is vertically supported.

7. The method according to claim 2, characterized in that between the transfer position (20) and the assembly position (21), the robot is automatically displaced in an assembly direction (21') which runs transversely and vertically (12) to the delivery direction (18'), when a new robot is inserted, this is automatically raised or lowered from the transfer position (20) to the assembly position (21), up to an assembly stop (22).

8. The method according to claim 1, characterized in that during step e), the aggregate is automatically positioned exactly relative to the base frame (2), by means of mechanical positioning elements (16*a, b*), centering elements (16*a, b*), or after step e) the position of the aggregate in the base frame (2) is determined automatically.

9. The method according to claim 1, characterized in that prior to step d) the new aggregate, insofar as it can assume different spatial states, is brought into a compact state in all spatial directions.

10. The method according to claim 1, characterized in that the robot (7) to be changed is an electric, pneumatic or hydraulic robot (7), a drive unit or a control robot (1*)

or a processing sealing robot.

11. The method according to claim 1, characterized in that the removal or delivery of an assembly is carried out by means of a delivery device (50), automatically, wherein, the delivery device (50) is capable of automatically bringing the new robot into the packaging line (1) as far as the transfer position (20), or the delivery device (50) is embodied to be self-propelled on the underground.

12. The method according to claim 1, characterized in that the exchange of the robot is carried out while the rest of the packaging line (1) is in operation and only the robot to be exchanged is deactivated, by switching off the power supply, also the data supply, of the robot to be changed or separating it from the rest of the packaging line (1).

* * * * *